United States Patent [19]

Morita et al.

[11] Patent Number: 4,668,714
[45] Date of Patent: May 26, 1987

[54] MOLDED DOSIMETER CONTAINING A RUBBER AND POWDERED CRYSTALLINE ALANINE

[75] Inventors: Yousuke Morita; Tadao Seguchi; Takuji Kojima; Ryuichi Tanaka, all of Gunma, Japan

[73] Assignee: Japan Atomic Energy Research Institute, Tokyo, Japan

[21] Appl. No.: 770,948

[22] Filed: Aug. 29, 1985

[30] Foreign Application Priority Data

Aug. 30, 1984 [JP] Japan ................ 59-180994
Oct. 19, 1984 [JP] Japan ................ 59-220232

[51] Int. Cl.$^4$ .......................... C08K 5/16; G21F 1/10; G01T 1/02; C08L 21/00
[52] U.S. Cl. .................... 523/136; 524/17; 524/18; 524/23; 524/24
[58] Field of Search ......................... 523/136

[56] References Cited

FOREIGN PATENT DOCUMENTS 1303278  1/1973  United Kingdom ............... 523/136

OTHER PUBLICATIONS

Chem. Abs. 93-175631d (1980), Kasa et al., "Phys. Med. Biol" 1980.
Chem. Abs. 76-148013w (1972), Bermann et al., 1971.
Chem. Abs. 74-133800k (1971), Descours et al.
Chem. Abs. 99-95512z (1983), Gupta et al., 1983.
Chem. Abs. 98-115450n (1983), Ostachuk et al., 1982.
Chem. Abs. 96-76161f (1982), Waligorski et al., 1981.
CEA-R-3913, France, 1970.
Int. J. Appl. Radiation Isotopes, vol. 33, pp. 1101-1114, 1982, Regulla et al., "Dosimetry by ESR Spectroscopy of Alanine.

*Primary Examiner*—Herbert J. Lilling
*Attorney, Agent, or Firm*—Browdy and Neimark

[57] ABSTRACT

An alanine dosimeter that enables accurate and simple measurement of the absorbed dose of an ionizing radiation is disclosed. The dosimeter uses as an alanine binder agent at least one member selected from among synthetic rubbers, and natural rubber.

11 Claims, 3 Drawing Figures

MOLDED DOSIMETER CONTAINING A RUBBER AND POWDERED CRYSTALLINE ALANINE

BACKGROUND OF THE INVENTION

The present invention relates to a molded dosimeter that provides for accurate and simple measurement of the absorbed doses of ionization radiations such as gamma-rays, X-rays, electron beams, neutron rays and heavily charged particle rays. The invention is intended for expanding the use of an alanine dosimeter.

Recent years have seen a rapid increase in the number of large facilities that handle radioactive substances (e.g. nuclear power plants and radioactive waste treating plants) and particle accelerators that produce a variety of ionizing radiations such as particle rays and gamma-rays. In these facilities and particle accelerators, it is required to provide for accurate and simple radiation dosimetry over a broad range that includes not only ordinary environments but also hot and humid environments. The present invention will provide great benefits for dosimetry conducted at these commercial facilities and at laboratories that use a variety of radiations for research and experimental purposes, as well as in dosimetric comparisons between particle accelerators.

Various solid-state dosimeters are known that are intended for measuring at medium: doses ranging from 10 Gy to 100 kGy, i.e. high level of dose, and they include thermoluminescent dosimeters, lyoluminescent dosimeters, polymethyl methacrylate dosimeters, radiochromic die film dosimeters and cobalt glass dosimeters. The operating principles of these dosimeters are similar to that after irradiating the solid-state device with a radiation of interest, the amount of luminescence emitted from the device by heating or the amount of light with a specific wavelength absorbed by the device is measured for determining the quantity of radiation that has fallen on the device.

These conventional dosimeters have the following defects: (1) Except for glass dosimeters, considerable dispersions will occur in dosimetric response characteristics (e.g. amount of luminesence from the device and the amount of light absorbed by the device) even if it is irradiated with a radiation of interest under the same conditions within the same environment; (2) Except for thermoluminescent dosimeters and radiochromic die film dosimeters, the conventional devices are subject to fading occurs, or a phenomenon wherein a time-dependent change occurs in the dosimetric response after irradiation of interest; (3) A narrow dynamic range over which accurate dosimetry can be made; and (4) Radiachromic die film dosimeters and lyoluminescent dosimeters are subject to considerable dispersions in dosimetric response resulting from changes in environmental factors such as temperature and humidity during irradiation of interest.

When the crystal of alanine, an amino acid, is irradiated with a radiation, it produces stable and characteristic radicals (free radicals) in precise proportion to the dose absorbed by the crystal, which can, therefore, be determined by measuring the concentration of radicals in unit weight of the crystal with a paramagnetic electron spin resonance (esr) instrument (CEA-R-3913, France, 1970). This method of dosimetry has none of the problems involved in the other conventional dosimeters described above. The radicals formed by irradiation with radiation remain stable within the crystal of analine and their concentration is subjected to a very small degree of time-dependent change. For the same reason, the radicals formed in the crystal of alanine are fairly stable against heat. Therefore, this method enables dosimetry to be performed with high precision and reproducibility. In addition, the dynamic range of the method is from 10 Gy and 100 kGy, permitting more reliable dosimetry at medium to high levels than any other conventional dosimeters.

The powder is so fine that the great tendency of the powder to attract static charges will present considerable difficulty in measuring its weight accurately or inserting it into a sample tube, i.e., it is very difficult to handle it. For this reason, the powder of analine crystal alone does not have much utility as a commercial dosimeter.

A few studies have been made in order to develop dosimeters that makes the most of the advantages of alanine crystal while eliminating any of the defects it has in powder form. Methods that hve been proposed in these studies and which are currently considered to be standard depend on using paraffin or a cellulose powder as a binder agent; the powder of alanine crystal is well dispersed in a melted paraffin, and the mixture is cooled to solidify with stirring, and then compressed into a pellet for use as a dosimetric element, or the powder of alanine crystal is mixed with cellulose powder and the mixture is compressed into a pellet for a dosimetric element (Inter. J. Appln. Radt. Isotope, 33, 1101 (1982), and Rad. Protection, EUR 7448-EN, vol. 12, 489 (1982)). However, the crystal analine pellets pressed together with paraffin or cellulose gives a brittle product which will easily break pieces or crumble upon external forces, and impacts thereby requiring to make careful treatment to accomplish accurate dosimetry. Furthermore, these pellets must be done by compression (for paraffin or cellulose), so the pressed products that can be obtained are limited to either pellets or short cylinders. It is practically impossible to realize mass production of these alanine crystal pellet having uniform properties by the above described method of using paraffin or cellulose. Further problems arise from the inherent properties of the binder agents used. Paraffin has a maximum melting point of about 70° C., so the alanine crystal pellet using paraffin as a binder agenft cannot be used in high-temperature environments such as where a metal container is irradiated with high dose rates. On the other hand, cellulose itself produces peroxide radiclas of which esr signals overlap these of radicals formed in the alanine crystal and make it difficult to accomplish esr determination of the accurate radical concentration due only to the analine crystal. Therefore, dosimetry with the alanine crystal pressed together with cellulose as a binder agent provides inaccurate results and the dynamic range of the device is narrower than that achieved by using the alanine crystal alone. Another problem occurs in the case of using cellulose as a binder agent; the cellulose is used as a powder which cannot be well mixed with the alanine powder to provide a uniform composition, and the resulting pressed products have considerable dispersion in composition.

SUMMARY OF THE INVENTION

The primary object, therefore, of the present invention is to provide a novel and practicable molded dosimeter using a powder of alanine crystal.

This object can be achieved by using as a binder agent a synthetic or natural rubber that produces a very small amount of radicals upon exposure to radiation and or that has its heat resistance improved by cross-linking treatment.

DETAILED DESCRIPTION OF THE INVENTION

Figure 1:
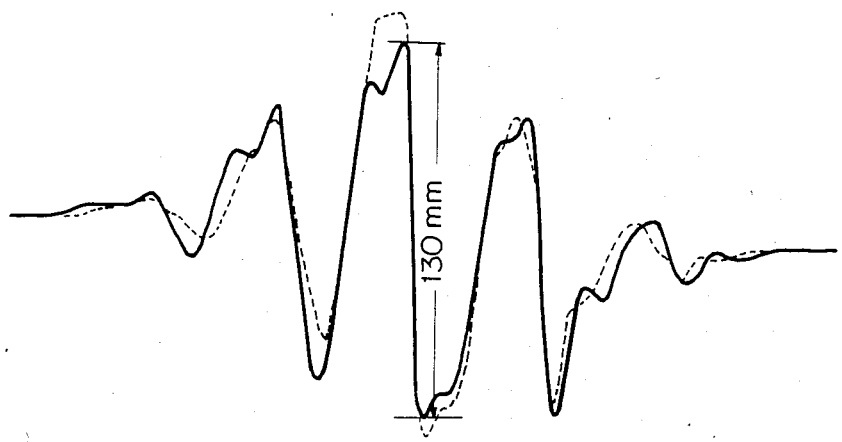
FIG. 1 is an esr chart showing the spectrum of the molded EPR dosimeter prepared in Example 1 (indicated by the solid line), the spectrum of an alanine powder (solid line) and prepared in Comparative Example 1 and the spectrum of the pressed compact also prepared in Comparative Example 1 from an alanine-cellulose mixture (dashed line)

In one aspect of the invention, a synthetic or natural rubber is used as a binder agent for molding the powder of alanine crystal. Such rubber is mixed with 10 to 500 parts by weight of the powder of analine crystal per one hundred parts by weight of the rubber. The blend may be immediately molded into a suitable form or treated with a radical generator to form a cross-linked molded product.

The synthetic rubber used in the present invention is preferably one that produces an insignificant amount of radicals upon irradiation with radiation at room temperature or above. Examples of synthetic rubbers that satisfy this requirement include ethylene-propylene(-dine) copolymer, ethylene-vinyl acetate copolymer, chloroprene rubber, nitrile rubber, butyl rubber, synthetic isoprene rubber, styrene-butadiene copolymer, styrene-butadiene-acrylonitrile copolymer, butadiene rubber, acrylic rubber, urethane rubber, silicone rubber, polyisobutylene, polyester rubber, epichlorohydrin rubber and tetrafluoroethylene-propylene alternating copolymer.

The upper limit of the proportion at which these rubbers are mixed with the powder of alanine crystal is determined so as to satisfy the requirement that the final molded product should have sufficient mechanical properties to withstand handling in practical applications. The lower limit of the proportions of the rubbers and the powder of alanine crystal is determined in such a manner that the molded product contains alanine in an amount effective for use as a dosimeter. In consideration of these factors, the powder of alanine crystal is to be mixed in amounts of 10–500 parts by weight with 100 parts by weight of the rubber. Uniform mixing of the rubber with the alanine powder may be efficiently performed by using mixing rolls, a Banbury mixer or other suitable devices that will not exert an excessively great force on the alanine crystal. The mixing may be performed at a temperature ranging from room temperature to the melting point of the alanine crystal (293° C.) and good results are obtained by conducting mixing at temperatures between 100° and 140° C., the usual range for rubber blending. This procedure yields a uniform composition of rubber and alanine, which is compressed, injected, extruded, filmed or otherwise molded into a suitable form at an appropriate temperature which is typically in the range of 60°–140° C. In order to provide a higher heat resistance, this composition may be mixed at about 30° C. with a significant amount of an organic peroxide (e.g. dicumyl peroxide, di-tertiary-butyl peroxide, diisopropylbenzenehydro peroxide or 2,4-dichlorobenzoyl peroxide), followed by molding the mixture at temperatures between 120° and 160° C. for a period of 10–30 minutes.

In order to facilitate the production of molded articles and films from the composition of the present invention and to increase the quality of the final product, reinforcements, fillers, extenders, pigments, lubricants, antioxidants and heat stabilizers that will have minimum effects on the formation of radicals in the alanine crystal may be added to the composition without compromizing the object of the invention.

The advantages of the present invention are hereunder described in greater detail by reference to working examples, wherein the amount of crystalline alanine powder is indicated in terms of phr, or parts per hundred of rubber or resin.

EXAMPLE 1

An ethylene-propylene copolymer (hereunder abbreviated as EPR, "EPO7P" of Nippon Synthetic Rubber Co., Ltd., with 26 wt% propylene) was kneaded on mixing rolls (twin-roll mill) at 120° C. To the kneaded EPR, 200 phr of crystalline DL-alanine powder (Wako Pure Chemical Industries, Ltd., guaranteed quality) was added in small portions, so as to form a uniform composition. The composition was subsequently compressed under hot press (120° C.) at a gauge pressure of 20 kg/cm$^2$ so as to prepare a molded EPR dosimeter as a sheet having a thickness of 2 mm.

A cross-linked EPR sheet was prepared from another lot of the previously obtained uniform composition of EPR and DL-alanine by first mixing the composition with 1 phr of dicumyl peroxide relative to EPR on mixing rolls at 30°–40° C. and by then compressing the mixture under a hot press (150° C.) for 20 minutes to form a sheet.

A test piece (2 mm×2 mm×3 cm) was cut from each of the sheets, and after irradiation with 5×10$^2$ Gy of $^{60}$Co-gamma rays at room temperature, the relative concentration of radicals formed in the test piece was determined with an esr spectrometer (JEOL-FE3X).

The concentration of radicals formed may be determined from the area of an integrated absorption peak on an esr spectrum, but in Examples and Comparative Examples, a simpler method was used and the peak-to-peak height on the first derivative of the absorption spectrum was used as a measure for the radical concentration. An esr chart of the molded EPR dosimeter prepared in this Example is shown in FIG. 1 by the solid line. The conditions for esr spectrometry were as follows: modulating frequency, 100 kHz, Mod 2G, power, 1 mW, and room temperature. FIG. 1 also shows an esr scan for the alanine powder (solid line) obtained in Comparative Example 1, which was in close agreement with the esr scan of the molded EPR dosimeter; this suggests that the amount of radicals formed in EPR was extremely small.

EXAMPLE 2

Figure 2:
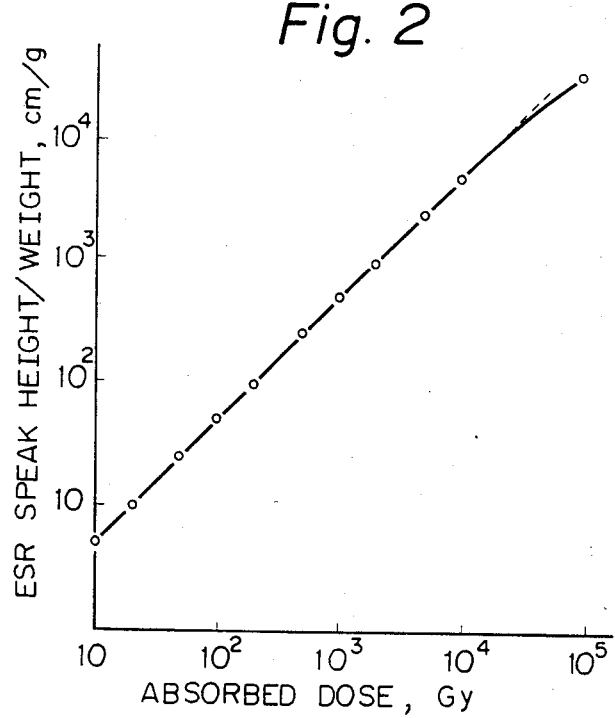
FIG. 2 is a graph showing the relationship between the peak height/weight for the esr spectrum of the molded EPR dosimeter prepared in Example 2 and the dose of radiation absorbed by that dosimeter.

The relationship between the height per unit weight (cm/g) of a peak on the esr spectrum of the molded EPR dosimeter prepared in Example 1 (this peak height is proportional to the concentration of radicals formed in alanine) and the dose of radiation (Gy) absorbed by the dosimeter was examined, and the results are shown in FIG. 2. The conditions of esr spectometry were the same as those used in Example 1. The dosimeter was irradiated with $^{60}$Co-gamma rays and the dose of gamma-rays absorbed by the dosimeter was calibrated by a standard Fricke dosimeter. In FIG. 2, o dinotes an uncross-linked molded EPR while Δ indicates a cross-linked molded EPR. With both molded EPR products, the logarithm of absorbed dose increased from 10 Gy to 100 kGy substantially linearly with the esr peak, and this suggests the usefulness of both molded products as a dosimeter.

EXAMPLE 3

Dosimeter samples were prepared from various molded rubbers under the same conditions as used in Example 1. The peak heights on the esr spectra of the respective dosimeters indicating the concentrations of radicals formed were determined and are shown in Table 1, from which one can see that the results with dimethyl silicone rubber, styrene-butadiene copolymer rubber, tetrafluoroethylene-propylene copolymer rubber and natural rubber were substantially the same as those with EPR, suggesting the usefulness of these rubbers in dosimeters.

EXAMPLE 4

The cross-linked molded EPR prepared in Example 1 was subjected to a tensile test and an Izod impact test, the results of which are shown in Table 2. The molded EPR in accordance with the present invention exhibited better mechanical properties than the two conventional samples, one using paraffin as a binder agent and the other incorporating cellulose, prepared in Comparative Example 2. This shows that the molded EPR dosimeter will satisfactorily withstand any vibration, impact and other external forces that may be exerted while it is used in dosimetry or during its transportation to a calibration center by mail.

EXAMPLE 5

EPR was kneaded with an alanine powder on mixing rolls as in Example 1. The mixture was fed into a Brabender extrusion molding machine, from which a wire sample (3 mm$^\phi$×5 m) was extruded at an exit temperature of 120° C. Ten pieces each having a length of 3 cm were cut randomly from the wire and an esr record was taken after exposure to $5\times10^2$ Gy of $^{60}$Co-gamma rays. The results are shown in Table 3, from which one can see that the ten pieces had very small dispersion in the esr peak height, suggesting the extremely high precision of dosimetry conducted by each of the molded EPR prepared in accordance with the present invention. The data shown in Table 3 were substantially the same as those for the compressed EPR dosimeter incorporating 200 phr of alanine (see Table 1).

EXAMPLE 6

Figure 3:
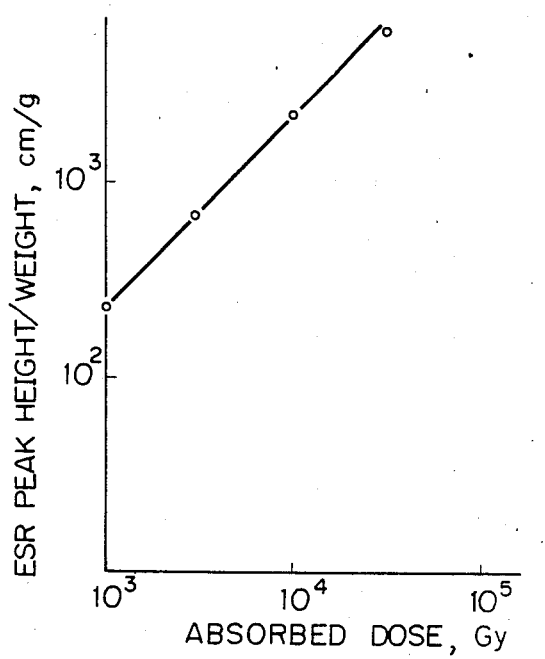
FIG. 3 is a graph showing the relathioship between the peak height/weight for the esr spectrum of the molded EPR dosimeter prepared in Example 6 by irradiation with electron beams and the dose of radiation absorbed by that dosimeter.

An EPR-alanine film having a thickness of 100 μm was prepared by repeating the procedure of Example 1. The alanine content of the film was 50 phr. The thin film was subjected to a shower of electron beams from an accelerator (Cockcroft-Walton type, Nisshin Hivol, Co., Ltd.) to give a total dose of 2 MeV at 0.1 mA (corresponding to a dose rate of 100 Gy/sec). The relationship between the abosrbed dose (Gy) as measured by a calorimeter and the esr peak height/weight (cm/g) of the irradiated films is shown in FIG. 3, from which one can see that the dose of electron beams can be reliably measured using a thin film of EPR-alanine composite.

COMPARATIVE EXAMPLE 1

A DL-alanine powder (Wako Pure Chemical Industries, Ltd., guaranteed quality) was irradiated with $5\times10^2$ Gy of $^{60}$Co-gamma rays, and the esr spectrum of the powder is shown in FIG. 1 by the solid line. A 1:1 (wt ratio) mixture of alanine and cellulose powders (Abicel PH 102 of Asahi Chemical Industry Co., Ltd.) was thoroughly mixed in a mortar and compressed (gauge pressure: 150 kg/cm$^2$) under a cold press (room temperature) into a short cylinder (3 mm$^\phi$×3 cm). The cylinder was likewise irradiated with $^{60}$Co-gamma rays and the esr spectrum of the so treated cylinder is shown in FIG. 1 by the dashed line.

When cellulose was used as a binder agent for the alanine powder, considerable difficulty was involved in handling during mixing and compression steps. In addition, in order to avoid any deformation, the mix had to be compressed at extreme pressures. Upon irradiation with gamma rays, the cellulose produced peroxide radicals whose esr spectrum was not in complete agreement with the esr spectrum of alanine radicals, as shown in FIG. 1. Furthermore, the peroxide radicals caused a time-dependent change in the performance of the cylinder and degraded the precision of dosimetry with this device.

COMPARATIVE EXAMPLE 2

Alanine powder was suspended in paraffin (ultra pure reagent of Wako Pure Chemical Industries, Ltd., mp. 68°–70° C.) as the latter was melted at 100° C. A uniform mixture was made and thereafter cooled by thorough agitation. The weight ratio of paraffin to alanine in the mixture was 1:1. The cooled mixture was compressed (gauge pressure: 150 kg/cm$^2$) under a cold press into a sheet (2 mm thick, 10 mm wide, 3 cm long). A sheet of the same dimensions was prepared from a mixture of cellulose and alanine by following the procedures of Comparative Example 1.

The two sheets were subjected to a tensile test and an Izod impact test, the results of which are shown in Table 2. Both sheets were very fragile and would easily break or crumble into small pieces.

COMPARATIVE EXAMPLE 3

A wire (3 mm$^\phi$) was prepared from a paraffin-alanine mixture (wt ratio, 1:1) using a Brabender extruder (barrel temperature: 80° C., exit temperature: 45°–50° C.) as in Example 5. The extrudate easily crumbled into loose particles and no firm sample could be obtained. Extrusion of a cellulose-alanine mixture was entirely impossible since both components were in the form of powder.

COMPARATIVE EXAMPLE 4

Attempts were made to form paraffin-alanine (wt ratio, 1:1) and cellulose-alanine (wt ratio, 1:1) sheets with a thickness of 100 μm by compression molding as in Example 6. However, no usable test sheets could be obtained since each of the mixes would break into tiny pieces as it was recovered from the mold.

The advantages of the rubber shaped dosimeter prepared in accordance with the present invention are summarized below.

(1) In case of the rubber molded dosimeter, the rubbers used as binder agents will produce insignificant amounts of esr detectable radicals upon exposure to radiation at temperatures higher than the glass transition points of these rubbers (most of which are within the range of about $-100°$ to $-50°$ C.), even at temperatures in the vicinity of room temperature. Since the concentration of radicals detected is limited to those formed in the alanine crystal, very accurate dosimetry is realized. In addition, the rubber molded dosimeter of the invention has a dynamic range of 10 Gy–100 kGy, which is as broad as that exhibited by the independent use of alanine crystal.

(2) The rubber and resin molded dosimeters of the invention can be handled as easily as the ordinary molded rubber or resins. The rubber molded dosimeter is so flexible that it will neither break or crumble in small pieces even if a relatively great force is exerted on it. Therefore, rubber dosimeters will allow for simple and reliable dosimetry. A further advantage results from the fact that the dosimeter can be made in the form of pellet, an elongated ribbon, film sheet or wire by using extrusion and other suitable molding techniques; such elongated dosimeter is highly adapted to the measurement of dose distribution within an object of a complex configuration.

(3) The rubber molded dosimeters of the present invention can be produced by a variety of molding techniques such as compression molding, extrusion molding and injection molding. By making use of these molding techniques, dosimeters of uniform quality can be produced in large quantities.

(4) The rubber molded dosimeters of the invention will satisfactorily withstand considerable degrees of vibration, impact and other external forces. After being exposed to radiation in nuclear power plants, radioactive waste treatment facilities and photon factories, the dosimeters may be mailed to a certain central standardization organization where they are checked against the correctly calibrated esr instrument for the purpose of centralized and systematic evaluation or comparison of doses.

By means of proper combination with the rubbers described earlier in this specification, a dosimeter that is substantially free from the defects of the conventional alanine powder based dosimeter can be obtained.

TABLE 1

Comparison of Dosimeters Prepared from Various Molded Rubbers

| | | Rubber Type | | | | | | |
|---|---|---|---|---|---|---|---|---|
| | | EPR (EPO7P of Nippon Synthetic Rubber Co., Ltd.) | | | | Dimethyl Silicone rubber (KE-55011 of Shin-Etsu Chemical Co., Ltd.) | Styrene-butadiene copolymer (JSR-1712 of Nippon Synthetic Rubber Co., Ltd.) | Tetrafluoro-ethylene-propylene copolymer (Aflas 150 of Asahi Glass Co., Ltd.) | Natural rubber (Malasia, SMR, SMR, GP) |
| | | Composition | | | | | | | |
| | | alanine 50 phr | alanine 100 phr | alanine 200 phr | alanine 300 phr | alanine 100 phr | alanine 200 phr | alanine 200 phr | alanine 200 phr |
| | | Crosslinking | | | | | | | |
| | Absorbed dose*[1] (Gy) | none | none | cross-linked | none | none | cross-linked*[3] | none | none | none |
| esr peak height/ weight (cm/g) | 10*[2] | 2.5 | 3.8 | 3.7 | 5.0 | 5.6 | 3.7 | 5.0 | 5.0 | 5.0 |
| | $5 \times 10^2$ | 125 | 188 | 186 | 246 | 281 | 185 | 248 | 246 | 248 |
| | $10^4$ | 2350 | 3560 | 3520 | 4710 | 5340 | 3500 | 4740 | 4700 | 4720 |

*[1]Irradiation with $^{60}$Co-gamma rays was performed at room temperature.
*[2]Measured with a known Fricke dosimeter.
*[3]Compression molded at 160° C. for 20 minutes after addition of 0.6 phr of dicumyl peroxide.

TABLE 2

Mechanical Properties of EPR Dosimeter

| | Example 4 | Comparative Example 2 | |
|---|---|---|---|
| | EPR (EPO7P) plus 200 phr of alanine*[2] | Paraffin plus 100 phr of alanine*[3] | Cellulose plus 100 phr of alanine *[4] |
| Tensile elongation*[1] (%) | 120*[5], 570*[5] | ≦1 | ≦1 |
| Tensile strength (kg/mm$^2$) | 0.2*[5], 0.72*[6] | ≦0.05 | ≦0.05 |
| Izod impact value (kg-cm/cm$^2$) | 22*[5], 25*[6] | 1.2 | 1.1 |

*[1]Drawn at 500 mm/min.
*[2]Test pieces: JIS Dumbbell No. 4 (in tensile test) 3 mm × 10 mm × 50 mm (in Izod impact test)
*[3]Test piece: 3 mm × 10 mm × 35 mm
*[4]Test piece: 3 mm × 10 mm × 35 mm
*[5]Uncross-linked sheet
*[6]Crosslinked sheet

TABLE 3

| Scattering of Measurements on Samples of Shaped EPR Dosimeter | | | | | | | | | | |
|---|---|---|---|---|---|---|---|---|---|---|
| | Sample No. | | | | | | | | | |
| | 1 | 2 | 3 | 4 | 5 | 6 | 7 | 8 | 9 | 10 |
| esr peak height/weight (cm/g) | 245 | 242 | 241 | 247 | 245 | 243 | 243 | 246 | 245 | 246 |

TABLE 4

| Mechanical Properties of Shaped Resin Dosimeters | | |
|---|---|---|
| | Composition | Izod impact value*[1] (kg-cm/cm$^2$) |
| Example 10 | Polystyrene (Diarex HH-102 of Mitsubushi Monsanto Co., Ltd.) plus 100 phr of alanine | 3.5 |
| | Polybutylene terephthalate (EPL Barox 310) plus 50 phr of alanine | 7.0 |
| | Polyethylene (UBE C-400) plus 100 phr of alanine | 27.5 |
| | Polypropylene (Nobrene BG1 of Mitsubishi Petrochemical Co., Ltd.) plus 100 phr of alanine | 7.5 |
| Comparative Example 2 | Paraffin (Wako Pure Chemical Industries, Ltd., mp. 68–70° C.) plus 100 phr of alanine | 1.1 |
| | Cellulose (Abicel pH 102 of Asahi Chemical Industry Co., Ltd.) plus 100 phr of ananine | 1.1 |

*[1]The test pieces were unnotched and measured 3 mm × 10 mm × 35 mm.

What is claimed is:

1. A molded rubber dosimeter comprising a molded blend of a binding amount of a synthetic or natural rubber with an amount of a crystalline alanine powder effective for a dosimeter, said synthetic or natural rubber generating an insignificant amount of free radicals when exposed to radiation at room temperature or above.

2. A dosimeter according to claim 1 wherein the powder of alanine crystal is present in an amount of 10–500 parts by weight per 100 parts by weight of the synthetic or natural rubber.

3. The dosimeter of claim 1, consisting essentially of said natural or synthetic rubber and said crystalline alanine powder.

4. The dosimeter of claim 2, consisting of said natural or synthetic rubber and said crystalline alanine powder.

5. The dosimeter of claim 1, wherein said synthetic rubber is selected from the group consisting of ethylene-propylene (-dine) copolymer, ethylene-vinyl acetate copolymer, chloroprene rubber, nitrile rubber, butyl rubber, synthetic isoprene rubber, styrene-butadiene copolymer, styrene-butadiene-acrylonitrile copolymer, butadiene rubber, acrylic rubber, urethane rubber, silicone rubber, polyisobutylene, polyester rubber, epichlorohydrin rubber and tetrafluoroethylene-propylene alternating copolymer.

6. The dosimeter of claim 2, wherein said synthetic rubber is selected from the group consisting of ethylene-propylene (-dine) copolymer, ethylene-vinyl acetate copolymer, chloroprene rubber, nitrile rubber, butyl rubber, synthetic isoprene rubber, styrene-butadiene copolymer, styrene-butadiene-acrylonitrile copolymer, butadiene rubber, acrylic rubber, urethane rubber, silicone rubber, polyisobutylene, polyester rubber, epichlorohydrin rubber and tetrafluoroethylene-propylene alternating copolymer.

7. The dosimeter of claim 3, wherein said synthetic rubber is selected from the group consisting of ethylene-propylene (-dine) copolymer, ethylene-vinyl acetate copolymer, chloroprene rubber, nitrile rubber, butyl rubber, synthetic isoprene rubber, styrene-butadiene copolymer, styrene-butadiene-acrylonitrile copolymer, butadiene rubber, acrylic rubber, urethane rubber, silicone rubber, polyisobutylene, polyester rubber, epichlorohydrin rubber and tetrafluoroethylene-propylene alternating copolymer.

8. The dosimeter of claim 7, wherein said powder of alanine crystal is present in an amount of 10–500 parts by weight per 100 parts by weight of the synthetic or natural rubber.

9. The dosimeter of claim 4, wherein said synthetic rubber is selected from the group consisting of ethylene-propylene (-dine) copolymer, ethylene-vinyl acetate copolymer, chloroprene rubber, nitrile rubber, butyl rubber, synthetic isoprene rubber, styrene-butadiene copolymer, styrene-butadiene-acrylonitrile copolymer, butadiene rubber, acrylic rubber, urethane rubber, silicone rubber, polyisobutylene, polyester rubber, epichlorohydrin rubber and tetrafluoroethylene-propylene alternating copolymer.

10. The dosimeter of claim 5, wherein said powder of alanine crystal is present in an amount of 10–500 parts by weight of the synthetic or natural rubber.

11. The dosimeter of claim 3, wherein said powder of alanine crystal is present in an amount of 10–500 parts by weight of the natural or synthetic rubber.

* * * * *